(12) United States Patent
Jaillant

(10) Patent No.: US 7,584,027 B2
(45) Date of Patent: Sep. 1, 2009

(54) AIRCRAFT NAVIGATION AID METHOD AND CORRESPONDING DEVICE

(75) Inventor: Jean-Christophe Jaillant, Tournefeuille (FR)

(73) Assignee: Thales (FR)

( * ) Notice: Subject to any disclaimer, the term of this patent is extended or adjusted under 35 U.S.C. 154(b) by 102 days.

(21) Appl. No.: 10/519,470

(22) PCT Filed: Jun. 27, 2003

(86) PCT No.: PCT/FR03/02001

§ 371 (c)(1),
(2), (4) Date: Dec. 29, 2004

(87) PCT Pub. No.: WO2004/005853

PCT Pub. Date: Jan. 15, 2004

(65) Prior Publication Data

US 2005/0234608 A1    Oct. 20, 2005

(30) Foreign Application Priority Data

Jul. 5, 2002    (FR) .................................. 02 08470

(51) Int. Cl.
    *G05D 1/00*    (2006.01)
(52) U.S. Cl. ........................... 701/3; 244/181; 340/973
(58) Field of Classification Search .................. 701/3,
    701/4, 14, 16, 5, 10, 13, 200, 211; 340/972,
    340/973, 977; 345/8, 619; 244/181, 183,
    244/75.1, 115; *G05D 1/00*
    See application file for complete search history.

(56) References Cited

U.S. PATENT DOCUMENTS

| | | | | |
|---|---|---|---|---|
| 3,786,505 A | * | 1/1974 | Rennie | 342/33 |
| 4,215,621 A | * | 8/1980 | Ausman | 89/1.56 |
| 4,283,705 A | * | 8/1981 | James et al. | 340/973 |
| 4,419,079 A | * | 12/1983 | Georges et al. | 434/43 |
| 5,748,867 A | * | 5/1998 | Cosman et al. | 715/811 |
| 6,092,007 A | | 7/2000 | Corning, III et al. | |
| 6,111,526 A | * | 8/2000 | Aymeric et al. | 340/972 |
| 6,112,141 A | * | 8/2000 | Briffe et al. | 701/14 |
| 6,262,674 B1 | * | 7/2001 | Wyatt | 340/975 |
| 6,696,980 B1 | * | 2/2004 | Langner et al. | 340/971 |

(Continued)

FOREIGN PATENT DOCUMENTS

FR    2803655    7/2001

OTHER PUBLICATIONS

Sachs, G., Dobler, K., Hermle, P., "Synthetic vision flight tests for curved approach and landing", Digital Avionics Systems Conference, 1998. Proceedings., 17th DASC. The AIAA/IEEE/SAE vol. 1, Oct. 31-Nov. 7, 1998 pp. E51/1-E51/8 vol. 1 Digital Object Identifier 10.1109/DASC.1998.741585.*

*Primary Examiner*—Tuan C To
(74) *Attorney, Agent, or Firm*—Lowe Hauptman Ham & Berner, LLP

(57) ABSTRACT

The invention relates to an aircraft navigation aid method. It comprises steps of computing a feeler line ground path that the aircraft would follow if a turn at the maximum rate applicable to the current flight phase of the aircraft were to begin at that instant, and displaying on a navigation screen the feeler line and a ground path to be captured, in order to determine how to place the aircraft in a turn in order to optimize the capture of the path to be captured

15 Claims, 4 Drawing Sheets

U.S. PATENT DOCUMENTS

| | | | |
|---|---|---|---|
| 6,708,090 B2 * | 3/2004 | Staggs | 701/3 |
| 6,708,091 B2 * | 3/2004 | Tsao | 701/9 |
| 6,995,690 B1 * | 2/2006 | Chen et al. | 340/974 |
| 2001/0023390 A1 * | 9/2001 | Gia | 701/301 |
| 2002/0010530 A1 * | 1/2002 | Knoll | 701/4 |
| 2002/0036574 A1 * | 3/2002 | Ishihara | 340/945 |
| 2002/0070950 A1 * | 6/2002 | Hammer | 345/618 |
| 2002/0099528 A1 * | 7/2002 | Hett | 703/13 |
| 2003/0071828 A1 * | 4/2003 | Wilkins et al. | 345/619 |
| 2003/0139877 A1 * | 7/2003 | Dwyer | 701/206 |
| 2003/0225486 A1 * | 12/2003 | Mardirossian | 701/3 |

* cited by examiner

AIRCRAFT NAVIGATION AID METHOD AND CORRESPONDING DEVICE

CROSS-REFERENCE TO RELATED APPLICATIONS

The present Application is based on International Application No. PCT/FR2003/002001, filed on Jun. 27, 2003, which in turn corresponds to FR 02/08470 filed on Jul. 5, 2002, and priority is hereby claimed under 35 USC §119 based on these applications. Each of these applications are hereby incorporated by reference in their entirety into the present application.

FIELD OF THE INVENTION

The invention relates to an aircraft navigation aid method and onboard device.

The field of the invention is that of aircraft navigation and safety aid and more specifically relates to aid in aligning an aircraft on a predefined path such as an approach path, for example.

The term path to be captured is also used to mean the path on which the aircraft must be aligned; it is primarily a path which does not change, or changes very little during capture.

In the description that follows, particular consideration will be given to the ground paths, in other words the projections on the ground of the aircraft flight paths.

DESCRIPTION OF THE PRIOR ART

As illustrated in FIG. 1, when an airplane, for example, is getting ready to land, the path 1 to be captured to land on a runway 5 is displayed on the navigation screen 4 of the airplane which is itself diagrammatically represented on the screen by the reference 3. This is a ground path 1 comprising altitude or check point fixes 2, sent by an air-traffic controller from the airport. As the airplane 3 advances, this ground path 1 scrolls under the airplane positioned in the middle of the navigation screen 4, the bearing of which is identified in degrees (275° in the case of the figure). To avoid overloading the figure, the measurements supplied by the sensors of the airplane that are displayed on this navigation screen are not represented.

In some cases, this path does not scroll precisely under the airplane, in particular when the very position of the airplane is not displayed on the navigation screen with sufficient accuracy. Such may be the case when the means of computing and/or displaying the path of the airplane that are on board the aircraft are insufficiently accurate.

In other cases, this path does not scroll under the airplane because the airplane is not aligned above, in particular because of the wind which offsets the airplane and, for example, prevents the planned turn from being observed correctly.

A number of options are then available to the pilot, whether the airplane is being piloted in manual mode or in "selection" mode in which the automatic pilot receives commands from the pilot instead of receiving them from the flight management system.

The airplane 3 controlled by the pilot may then capture this path 1 later, at the end of a path 10 as illustrated in FIG. 2a); in this case, the pilot has less time remaining to carry out the various landing procedures which, because of this, become more risky.

To avoid this situation, the pilot may decide to describe a loop 11 as illustrated in FIG. 2b); this enables him to capture the path 1 at a point that will not penalize him in carrying out the various landing procedures. However, this solution then delays the landing of the airplane which presents risks for the next airplane when the landing windows between two airplanes are close together.

In another solution, the pilot himself anticipates the turn; however, it is difficult for the pilot to take accurate account of the effect of the wind that will be felt during the capture turn.

An arc of a circle predicting the trend of the air path for the airplane immediately the latter starts turning can also be computed by onboard computation means and displayed on the navigation screen. An air path is an ideal path that does not take account of the wind effect. However, it is only a trend and such an arc of a circle does not predict the future air path before the turn or the future ground path of the airplane, in particular in the case of wind.

Another common drawback to these solutions is the inability to determine the capture position or instant accurately.

SUMMARY OF THE INVENTION

An important object of the invention is therefore to enable a predefined path to be captured optimally, taking into account the effect of the wind on the path of the aircraft.

In the description that follows, the term feeler line is used to mean the ground path that the aircraft would follow if a turn at the maximum rate applicable to the current flight phase of the aircraft were to begin at this instant.

To achieve these objectives, the invention proposes an aircraft navigation aid method, characterized in that it comprises the following steps consisting in:

a) computing a feeler line according to the wind, b) displaying on a navigation screen the feeler line and a ground path to be captured, in order to determine how to place the aircraft in a turn in order to optimize the capture of the path to be captured.

According to a feature of the invention, it also comprises a step consisting in giving the turn command when the feeler line is tangential to the ground path to be captured.

The method according to the invention is based on the simultaneous display (step b) of a path to be captured which a priori does not change or changes little during capture and a feeler line computed (step a) according to the wind at successive instants: immediately it appears that the feeler line is tangential to the path to be captured, an aircraft turn command is given (step c), this turn, given the wind, enabling the capture of the path to be optimized, otherwise the steps a), b) and c) are repeated.

The turn is determined to enable the path to be captured better than if the aircraft had been placed in the turn strictly observing the path to be captured; offset by the wind, the airplane would then have captured the path later (or, possibly, sooner). This early (or delayed) turn also makes it possible to accurately predict the capture point, in other words the position relative to the ground of the capture point and, where appropriate, the instant of capture, and this regardless of the initial position and orientation of the aircraft and irrespective of the piloting mode.

Another object of the invention is to produce an onboard aircraft navigation aid device comprising at least a program memory and a user interface, characterized in that the program memory comprises a feeler line computation program, and a program for displaying on the user interface a path to be captured and the feeler line.

BRIEF DESCRIPTION OF THE DRAWINGS

Other features and advantages of the invention will become apparent on reading the detailed description that follows, given by way of non-limiting example and with reference to the appended drawings in which.

DETAILED DESCRIPTION OF THE INVENTION

In the description that follows, an airplane is taken as a typical aircraft.

Figure 3:
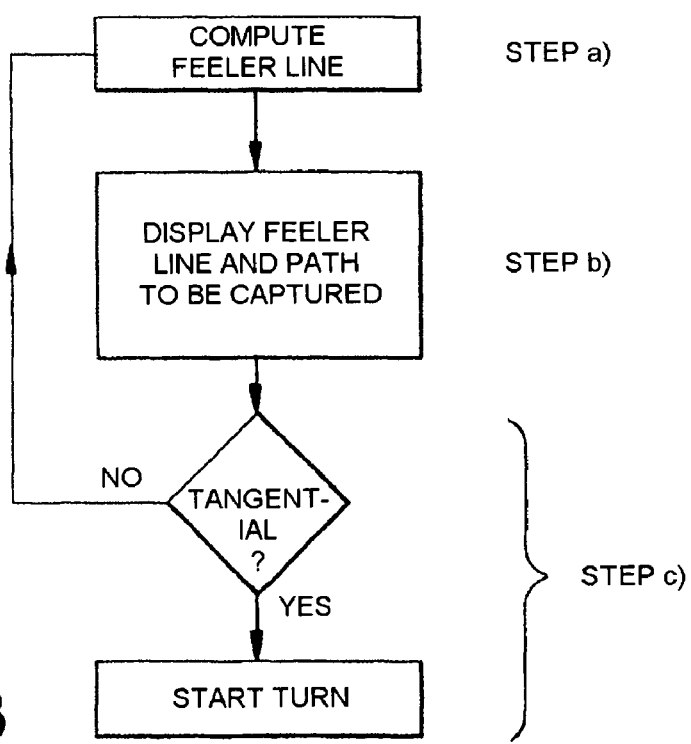
FIG. 3 is a flow diagram representing the main steps of the method according to the invention, FIG. 4 diagrammatically illustrates the comparison of a feeler line and a path to be captured for two positions A or B of the airplane, FIG. 5 diagrammatically represents examples of feeler line forms in the case of an instantaneous turn, with no drift of the airplane, depending on whether the wind is a following wind (a), an SE-NW wind (b) or a crosswind (c), FIG. 6 diagrammatically represents an example of form of right (R) and left (L) feeler line including the distance to the turn and the drift of the airplane for an SW-NE wind, FIG. 7 diagrammatically represents an onboard navigation aid device according to the invention.

As is illustrated in the flow diagram of FIG. 3, the method according to the invention is based on the simultaneous display (step b) of a path to be captured which a priori does not change or changes little during capture and a feeler line computed (step a) according to the wind at successive instants: immediately it appears that the feeler line is tangential to the path to be captured, an aircraft turn command (step c) is given, this turn, given the wind, enabling the capture of the path to be optimized. Otherwise the steps a), b) and c) are repeated.

Figure 4:
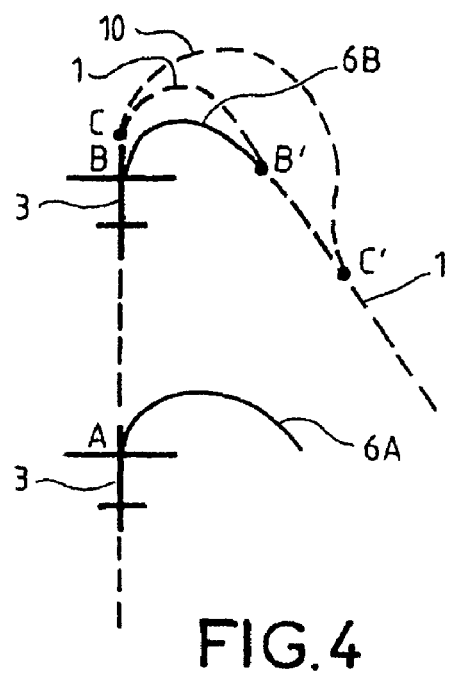

The comparison between the feeler line and the path to be captured is illustrated in FIG. 4 in which the airplane 3 is represented at two positions A and B of its path. The feeler line 6A corresponding to the position A of the airplane 3 is not yet tangential to the path 1 to be captured and the steps a), b) and c) are repeated at the next instant. The feeler line 6B corresponding to the position B of the airplane 3 is tangential to the path 1 to be captured; in this case, the airplane 3 is placed in a turn at the point B for a turn at maximum rate, in other words at the rate corresponding to that of the feeler line.

This rate of turn is typically that which corresponds to a roll angle of 25°; it decreases at high altitude.

This anticipation at B of the turn enables the path 1 to be captured at the point B' and therefore earlier than if the airplane had been placed in a turn at the point C strictly observing the path 1; offset by the wind, the airplane 3 would then have captured the path 1 only at the point C' after having followed the path 10. This anticipation also makes it possible to predict accurately the capture point B', in other words the position relative to the ground of the capture point and the instant of capture, and this regardless of the angle of interception, in other words regardless of the initial position and orientation of the airplane and irrespective of the piloting mode (with or without radar guidance, etc).

The computation, display and conditional turn steps a), b) and c) can be carried out automatically, in other words by computation means on board the airplane.

According to a particular embodiment, the pilot visually compares the path to be captured and the feeler line using the navigation screen. Immediately it appears that the feeler line is tangential to the path to be captured, the pilot gives the airplane turn command.

The steps a), b) and c) can be performed throughout the flight. They are preferably performed on a command from the flight management system (FMS) or on a command from the pilot on both sides of the airplane in which case a right feeler line and a left feeler line are obtained or on the side of the required turn in which case a right or left feeler line is obtained.

More generally, each computation and/or display and/or conditional turn step can be controlled by the pilot or automatically by the flight management system.

The control of step a) and, where appropriate, of steps b) and c) can be selected by the pilot using, for example, a menu presented via a user interface such as the multi-control display unit (MCDU) interface, this interface being linked to the flight management system and to the navigation receivers. This menu can be used by the pilot to select, for the feeler line, the side of the required turn, the feeler line then being displayed only on that side.

The steps a), b) and, where appropriate, step c) can also be controlled by the pilot or automatically at the time of a change of flight mode, for example on switching from the HVS (Heading/Vertical Speed) mode in which the wind is a factor to the FPA (Flight Path Angle) mode in which the wind is not a factor.

The steps a), b) and, where appropriate, step c) can also be controlled by the pilot by other means such as the rotation for example by one degree by the pilot of a selector knob, on the side of the required turn, the feeler line then being displayed only on that side.

The steps a), b) and c) can be stopped as indicated previously, on a command from the flight management system or from the pilot, for example by turning the selector knob in the opposite direction.

The feeler line is computed according to the wind. The first step will be to consider that the distance that the airplane travels to reach the turn bank angle (25° for example) is zero; this distance is also designated the distance to the turn.

The form of the feeler line results from the rotation of the airplane about its center of turn compounded with a shift of this center by the effect of the wind. When the distance to the turn is zero, it is obtained by a parametric equation which is expressed as follows in a reference frame (O, x, y) centered on the center of gravity of the airplane, the axis Oy coinciding with the axis of the airplane:

$$\begin{cases} x = \pm R_{air}\left[1 - \cos(t\dot{\theta})\right] + V_x^* t \\ y = R_{air}^* \sin(t\dot{\theta}) + V_y^* t \end{cases} \quad (1)$$

$R_{air}$ being the radius of the turn that the airplane would have without wind, $\dot{\theta}$ being the angular speed (or rate of turn) of the airplane in the air during the turn that the airplane would have without wind, $V_x$ and $V_y$ being the components of the wind speed vector, t being the time with t=0 at the start of the turn.

The sign before $R_{air}$ is the + sign when it concerns a feeler line to the right of the airplane (right feeler line) and the − sign when it concerns a feeler line to the left of the airplane (left feeler line).

Figure 5:
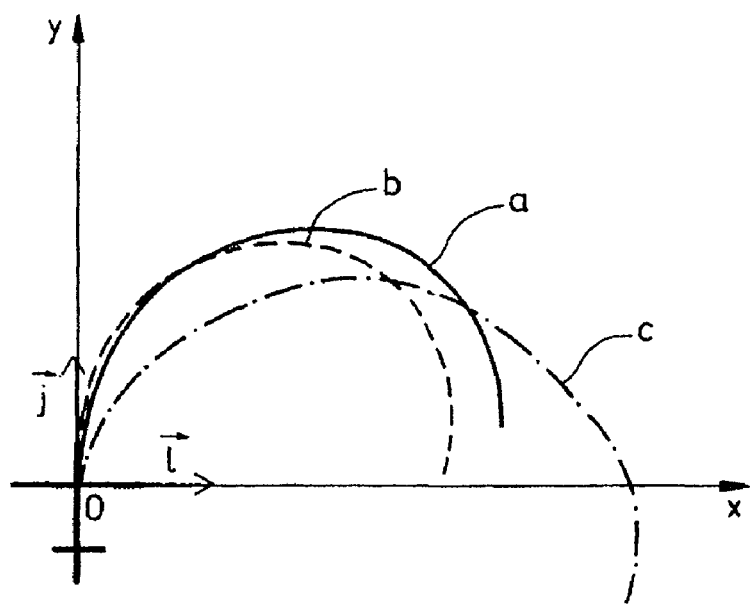

The form of the feeler line depends on the wind: examples of right feeler line form corresponding to this equation (1) are presented in FIG. 5. They were obtained with:

$R_{air}$=1.6 Nm (nautical miles); $\dot{\theta}$ $R_{air}$=TAS=221 knots (linear ground speed of the airplane); $\phi_x$=$\phi_y$=0;

the curve a) corresponds to a following wind such that $V_x$=0 and $V_y$=30 knots;

the curve b) corresponds to a south east-north west wind such that $V_x$=−15 knots and $V_y$=20 knots;

the curve c) corresponds to a crosswind such that $V_x$=40 knots and $V_y$=0.

The form of the feeler line and therefore the capture of the path to be captured are optimal when the wind is constant and when the acceleration of the airplane does not change between the start and the end of the turn.

As indicated, the parametric equation (1) does not take into account the distance to the turn, in other words the segment of path corresponding to the time to start the turn also designated by the time to start the roll and which is linked to the inertia time of the airplane; a good approximation involves assuming that this segment is straight and along the axis of the path of the airplane. This means adding, for the computation of y, a term $D_v$ for distance to the turn. This term $D_v$ is expressed as follows:

$$D_v = TAS|\Delta_{roll}|/Tx_{roll} + \text{In} \times TAS$$

TAS being the linear ground speed of the airplane, in knots, $\Delta_{roll}$ being the difference expressed in degrees between the roll angle at the end of the time to start the roll, in other words the roll angle that the airplane will have at the start of the turn (25° for example), and the roll angle at the start of the roll (0° when the airplane is not already turning), $Tx_{roll}$, the rate of roll in degrees per second, which depends on the airplane, and In being an inertia factor in seconds, which depends on the airplane.

The equation (1) becomes:

$$\begin{cases} x = \pm R_{air}[1 - \cos(t\dot{\theta})] + V_x t \\ y = R^*_{air}\sin(t\dot{\theta}) + V_y t + D_v \end{cases} \quad (2)$$

Figure 6:
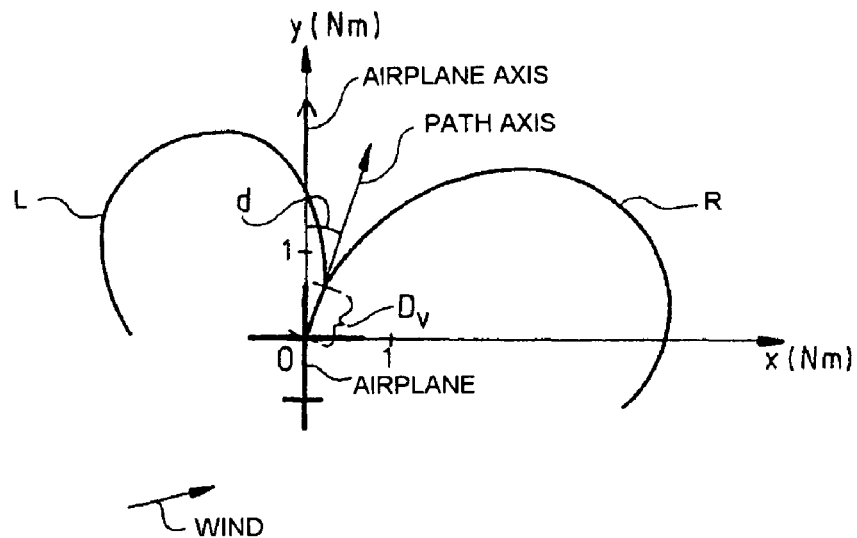

Moreover, when the airplane is subject to the effect of the wind, it is subject to a drift; the result is that the axis of the path no longer normally coincides with the axis of the airplane as illustrated in FIG. 6. The drift angle d is the angle between these two axes.

Since the feeler line is tangential to the ground speed vector of the airplane, a vector that corresponds to the axis of the path, the form of the feeler line is ultimately obtained by applying to the equation 2, a rotation of center O and of angle equal to the angle of drift.

The form of the feeler line is then obtained by the following equation:

$$\begin{cases} x = \lfloor \pm R_{air}[1 - \cos(t\dot{\theta})] + V_k t \rfloor \cos d - \lfloor R_{air}\sin(t\dot{\theta}) + V_y t + D_v \rfloor \sin d \\ y = \lfloor \pm R_{air}[1 - \cos(t\dot{\theta})] + V_k t \rfloor \sin d + \lfloor R_{air}\sin(t\dot{\theta}) + V_y t + D_v \rfloor \cos d \end{cases} \quad (3)$$

The form of the right and left feeler lines represented in FIG. 6 by the curves R) and L) was obtained from the following data.

Figure 1:
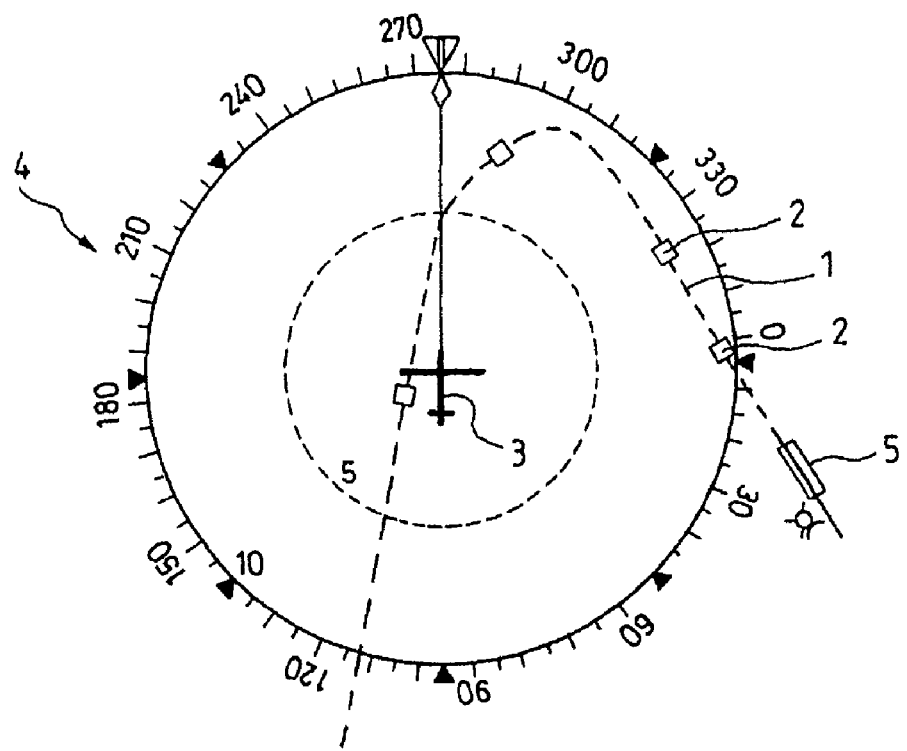
FIG. 1, already described, diagrammatically represents a navigation screen displaying a path to be captured, FIGS. 2a) and 2b), already described, diagrammatically represent examples of paths of the airplane when the latter cannot follow the path to be captured because of the effect of the wind.
Figure 2A:
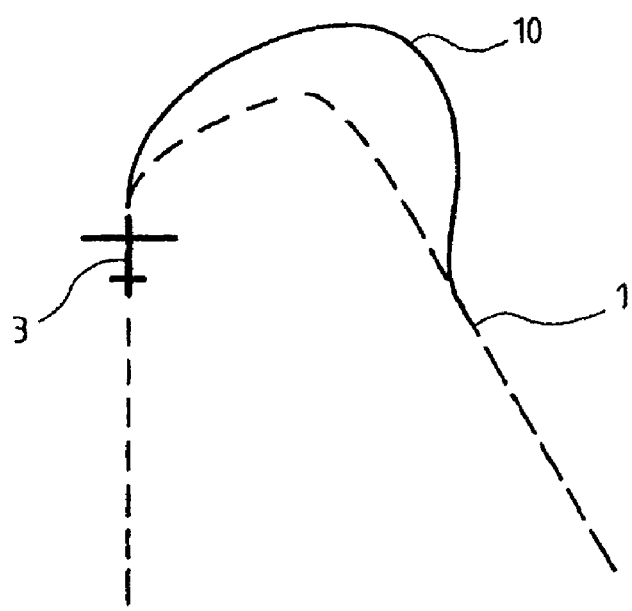
Figure 2B:
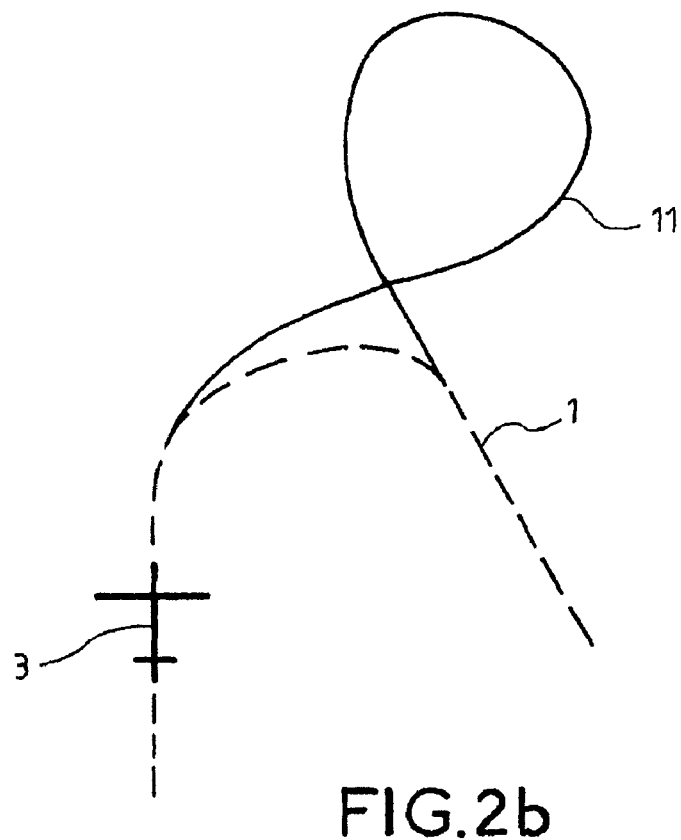

The airplane is flying on bearing 275° (as represented in FIG. 1), coinciding with the axis Oy with an air speed of 228 knots; its air turn radius is therefore equal to 1.62 Nm and its angular speed is equal to 228/1.62 radians/hour. The axis Ox coincides with the 5° orientation. The navigation receivers indicate a wind of 35 knots from bearing 170° (or 15° relative to Ox), a flight route followed at 283° and a ground speed of 242 knots. The components $V_x$ and $V_y$ of the wind are respectively 34 and 9 knots.

The result is then for equation (1) for a right feeler line:

$$\begin{cases} x = 1.62[1 - \cos(t \times 228/1.62) + 34t] \\ y = 1.62\sin(t \times 228/1.62) + 9t + 0.517 \end{cases}$$

Similarly, the result is then for equation (1) for a left feeler line:

$$\begin{cases} x = 1.62[1 - \cos(t \times 228/1.62) + 34t] \\ y = 1.62\sin(t \times 228/1.62) + 9t + 0.517 \end{cases}$$

The distance to the turn $D_v$ at the bank angle of 25° is computed from the following data:

$\Delta_{roll}$=+25°−0°, $Tx_{roll}$=5°/sec and In=2.7 sec.

$$D_v = (242/3600) \times (25/5) + 2.7 \times (242/3600) = 0.517$$

Given that the original roll angle is 0°, Dv is the same for the right or left feeler lines. When the original roll angle is greater than approximately 2°, the distance to the turn is shorter to the right than to the left; conversely, when the original roll angle is less than approximately −20, the distance to the turn is shorter to the left than to the right.

By adding this distance to the axis Oy, the following equation (2) is then obtained for the right feeler line:

$$\begin{cases} x = 1.62[1 - \cos(t \times 228/1.62) + 34t] \\ y = 1.62\sin(t \times 228/1.62) + 9t + 0.517 \end{cases}$$

Similarly, the following equation (2) is obtained for the left feeler line:

$$\begin{cases} x = 1.62[1 - \cos(t \times 228/1.62) + 34t] \\ y = 1.62\sin(t \times 228/1.62) + 9t + 0.517 \end{cases}$$

Since the drift sustained is 8° to the right (=283°−275°), the line corresponding to the equation (2) must be turned 8° to the right, or −0.148 radian.

The form of the right feeler line ultimately obeys the following equation (3):

$$\begin{cases} x = [1.62[1-\cos(t\times 228/1.62)] + 34t]\cos(-0.148) - [1.62\sin(t\times 228/1.62) + 9t + 0.517]\sin(-0.148) \\ y = [1.62[1-\cos(t\times 228/1.62)] + 34t]\sin(-0.148) + [1.62\sin(t\times 228/1.62) + 9t + 0.517]\cos(-0.148) \end{cases}$$

The form of the left feeler line ultimately obeys the following equation (3):

$$\begin{cases} x = [1.62[1-\cos(t\times 228/1.62)] + 34t]\cos(-0.148) - [1.62\sin(t\times 228/1.62) + 9t + 0.517]\sin(-0.148) \\ y = [1.62[1-\cos(t\times 228/1.62)] + 34t]\sin(-0.148) + [1.62\sin(t\times 228/1.62) + 9t + 0.517]\cos(-0.148) \end{cases}$$

If the result of the comparison of this feeler line with the path to be computed is that the tangent point corresponds to a bearing variation of 223°, the capture instant $t_c$ can be computed from the start of the turn:

$t_c$=bearing variation/angular speed $t_c$=(223×3.14/180)/(228/1.62)=0.02778 $h$=100 sec.

Given that $t_c$ is computed from the start of the turn, it may be useful for the pilot to add the time to the turn, in other words the time taken to travel $D_v$. In the abovementioned example, this time is approximately 2 s to change from a roll angle of 0° to an angle of 25°.

A path presenting a curve is taken as an example of path to be captured; the invention applies equally to straight-line paths and to other forms of path.

Examples of paths to be captured can include an approach path, a path to avoid obstacles displayed on the navigation screen (relief, cloud masses supplied by the weather radar, etc) or a traffic avoidance path, where appropriate.

The method described is implemented in an onboard aircraft navigation aid device.

Figure 7:
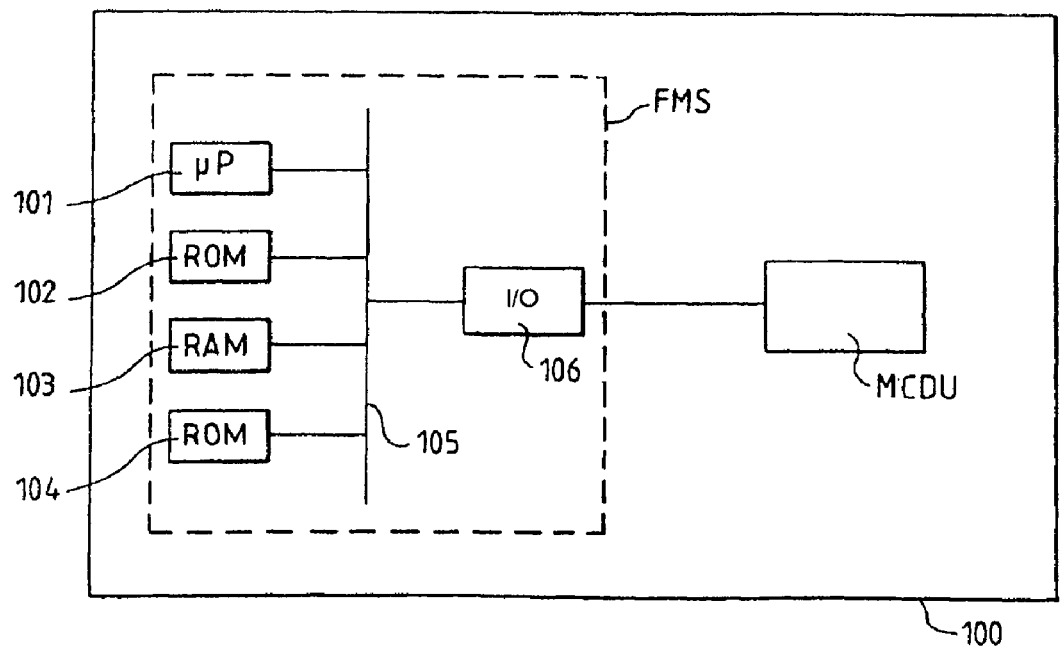

An example of this device 100 is represented in FIG. 7. It conventionally comprises one or more microprocessors 101 coupled with a program memory 102 of ROM type for example, a working memory 103, of RAM type for example, and one or more memories 104 of ROM type for example, to store the path to be captured and the feeler line, as well as the circuits 105 for transferring data between these various elements. The program memory 102 contains the operating program of the method, in the form of source code, whereas the working memory 103 comprises registers that can be updated to store computation results. This device 100 also comprises a communication interface 106 to enable data to be interchanged with devices, such as, for example, with the user interface "MCDU", with sensors, etc.

These elements are, for example, included in the flight management system (FMS). They can also be included in the form of custom integrated circuits, designed to implement the method.

The "MCDU" user interface comprises at least a navigation screen, means of displaying on this screen the path to be captured and the feeler line and, where appropriate, means of controlling the computation of the feeler line and/or the display of the feeler line and/or the turning of the airplane when the feeler line is tangential to the path to be captured, via a keyboard, for example.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon bee limited only by the definition contained in the appended claims and equivalents thereof.

I claim:

1. An aircraft navigation aid method comprising the following steps:
   a) computing a feeler line ground path, wherein the feeler line ground path is a projection on the ground of a flight path that an aircraft follows when turning at the maximum rate, and the computing of the feeler line ground path includes taking into account the effect of the wind on the path of the aircraft; and
   b) displaying simultaneously on a navigation screen two alternative flight paths for the aircraft, the two alternative flight paths being the feeler line ground path and a ground path to be captured and the ground path to be captured is a projection on the ground of a flight path to be captured, in order to determine how to place the aircraft in a turn in order to optimize the capture of the flight path to be captured.

2. The method as claimed in claim 1, comprising: giving a turn command when the feeler line is tangential to the ground path to be captured.

3. The method as claimed in claim 1, wherein each computation and/or display and/or conditional turn command step is controlled automatically or by the pilot of the aircraft.

4. The method as claimed in claim 1, wherein a form of a right feeler line is given by a parametric equation of the form:

$$\begin{cases} x = \lfloor R_{air}[1-\cos(t\dot\theta)] + V_k t \rfloor \cos d - \lfloor R_{air}\sin(t\dot\theta) + V_y t + D_v \rfloor \sin dll' \\ y = \lfloor R_{air}[1-\cos(t\dot\theta)] + V_k t \rfloor \sin d + \lfloor R_{air}\sin(t\dot\theta) + V_y t + D_v \rfloor \cos dll' \end{cases}$$

$R_{air}$ being the radius of the turn that the airplane would have without wind, $\dot\theta$ being the angular speed of the airplane in the air during the turn that the airplane would have without wind, $V_x$ and $V_y$ being the components of the wind speed vector, t being the time with t=0 at the start of the turn, $D_v$ being the distance to the turn and d being the drift angle.

5. The method as claimed in claim 1, wherein a form of a left feeler line is given by a parametric equation of the form:

$$\begin{cases} x = \lfloor R_{air}[1-\cos(t\dot\theta)] + V_x t \rfloor \cos d - \lfloor R_{air}\sin(t\dot\theta) + V_y t + D_v \rfloor \sin dll! \\ y = \lfloor R_{air}[1-\cos(t\dot\theta)] + V_x t \rfloor \sin d + \lfloor R_{air}\sin(t\dot\theta) + V_y t + D_v \rfloor \cos dll' \end{cases}$$

$R_{air}$ being the radius of the turn that the airplane would have without wind, $\dot\theta$ being the angular speed of the airplane in the air during the turn that the airplane would have without wind, $V_x$ and $V_y$ being the components of the wind speed vector, t being the time with t=0 at the start of the turn, $D_v$ being the distance to the turn and d being the drift angle.

6. The method as claimed in claim 2, wherein each computation and/or display and/or conditional turn command step is controlled automatically or by the pilot of the aircraft.

7. The method as claimed in claim 2, wherein a form of a right feeler line is given by a parametric equation of the form:

$$\begin{cases} x = \lfloor R_{air}[1-\cos(t\dot\theta)] + V_x t \rfloor \cos d - \lfloor R_{air}\sin(t\dot\theta) + V_y t + D_v \rfloor \sin dll' \\ y = \lfloor R_{air}[1-\cos(t\dot\theta)] + V_x t \rfloor \sin d + \lfloor R_{air}\sin(t\dot\theta) + V_y t + D_v \rfloor \cos dll' \end{cases}$$

$R_{air}$ being the radius of the turn that the airplane would have without wind, $\dot\theta$ being the angular speed of the airplane in the air during the turn that the airplane would have without wind, $V_x$ and $V_y$ being the components of the wind speed vector, t being the time with t=0 at the start of the turn, $D_v$ being the distance to the turn and d being the drift angle.

8. The method as claimed in claim 3, wherein a form of a right feeler line is given by a parametric equation of the form:

$$\begin{cases} x = \lfloor R_{air}[1-\cos(t\dot\theta)] + V_x t \rfloor \cos d - \lfloor R_{air}\sin(t\dot\theta) + V_y t + D_v \rfloor \sin dll' \\ y = \lfloor R_{air}[1-\cos(t\dot\theta)] + V_x t \rfloor \sin d + \lfloor R_{air}\sin(t\dot\theta) + V_y t + D_v \rfloor \cos dll' \end{cases}$$

$R_{air}$ being the radius of the turn that the airplane would have without wind, $\dot\theta$ being the angular speed of the airplane in the air during the turn that the airplane would have without wind, $V_x$ and $V_y$ being the components of the wind speed vector, t being the time with t=0 at the start of the turn, $D_v$ being the distance to the turn and d being the drift angle.

9. The method as claimed in claim 2, wherein a form of a left feeler line is given by a parametric equation of the form:

$$\begin{cases} x = \lfloor R_{air}[1-\cos(t\dot\theta)] + V_x t \rfloor \cos d - \lfloor R_{air}\sin(t\dot\theta) + V_y t + D_v \rfloor \sin dll' \\ y = \lfloor R_{air}[1-\cos(t\dot\theta)] + V_x t \rfloor \sin d + \lfloor R_{air}\sin(t\dot\theta) + V_y t + D_v \rfloor \cos dll' \end{cases}$$

$R_{air}$ being the radius of the turn that the airplane would have without wind, $\dot\theta$ being the angular speed of the airplane in the air during the turn that the airplane would have without wind, $V_x$ and $V_y$ being the components of the wind speed vector, t being the time with t=0 at the start of the turn, $D_v$ being the distance to the turn and d being the drift angle.

10. The method as claimed in claim 3, wherein a form of a left feeler line is given by a parametric equation of the form:

$$\begin{cases} x = \lfloor R_{air}[1-\cos(t\dot\theta)] + V_x t \rfloor \cos d - \lfloor R_{air}\sin(t\dot\theta) + V_y t + D_v \rfloor \sin dll' \\ y = \lfloor R_{air}[1-\cos(t\dot\theta)] + V_x t \rfloor \sin d + \lfloor R_{air}\sin(t\dot\theta) + V_y t + D_v \rfloor \cos dll' \end{cases}$$

$R_{air}$ being the radius of the turn that the airplane would have without wind, $\dot\theta$ being the angular speed of the airplane in the air during the turn that the airplane would have without wind, $V_x$ and $V_y$ being the components of the wind speed vector, t being the time with t=0 at the start of the turn, $D_v$ being the distance to the turn and d being the drift angle.

11. An onboard aircraft navigation aid device comprising at least a program memory and a user interface, comprising: a program memory configured to store a feeler line computation program, for computing a feeler line ground path, wherein the feeler line ground path is a projection on the ground of a flight path that the aircraft follows when turning at the maximum rate, and the computing of the feeler line ground path includes taking into account the effect of the wind on the path of the aircraft, and configured to store a program for displaying simultaneously on the user interface two alternative paths for the aircraft, the two alternative paths being a ground path to be captured and the feeler line ground path, wherein the ground path to be captured is a projection on the ground of a flight path to be captured.

12. The device as claimed in claim 11, wherein the user interface comprises means of controlling the computation of the feeler line.

13. The device as claimed in claim 12, wherein the user interface also comprises means of controlling the display of the feeler line.

14. An aircraft navigation aid method comprising the following steps:
a) computing a feeler line ground path, wherein the feeler line ground path is a projection on the ground of a flight path that an aircraft would follows when turning at the maximum rate, and the computing of the feeler line ground path includes taking into account the effect of the wind on the path of the aircraft;
b) displaying simultaneously on a navigation screen two alternative flight paths for the aircraft, the two alternative flight paths being the feeler line ground path and a ground path to be captured and the ground path to be captured is a projection on the ground of a flight path to be captured, in order to determine how to place the aircraft in a turn in order to optimize the capture of the flight path to be captured, wherein a form of a right feeler line is given by a parametric equation of the form:

$$\begin{cases} x = \lfloor R_{air}[1-\cos(t\dot\theta)] + V_g t \rfloor \cos d - \lfloor R_{air}\sin(t\dot\theta) + V_y t + D_V \rfloor \sin dll' \\ y = \lfloor R_{air}[1-\cos(t\dot\theta)] + V_x t \rfloor \sin d + \lfloor R_{air}\sin(t\dot\theta) + V_y t + D_V \rfloor \cos dll' \end{cases}$$

$R_{air}$ being the radius of the turn that the airplane would have without wind, $\dot\theta$ being the angular speed of the airplane in the air during the turn that the airplane would have without wind, $V_x$ and $V_y$ being the components of the wind speed vector, t being the time with t=0 at the start of the turn, $D_v$ being the distance to the turn and d being the drift angle.

15. An aircraft navigation aid method comprising the following steps:
a) computing a feeler line ground path, wherein the feeler line ground path is a projection on the ground of a flight path that an aircraft follows when turning at the maximum rate, and the computing of the feeler line ground path includes taking into account the effect of the wind on the path of the aircraft;
b) displaying simultaneously on a navigation screen two alternative flight paths for the aircraft, the two alternative flight paths being the feeler line ground path and a ground path to be captured and the ground path to be captured is a projection on the ground of a flight path to be captured, in order to determine how to place the aircraft in a turn in order to optimize the capture of the flight path to be captured, wherein a form of a left feeler line is given by a parametric equation of the form:

$$\begin{cases} x = \lfloor R_{air}[1-\cos(t\dot\theta)] + V_8 t \rfloor \cos d - \lfloor R_{air}\sin(t\dot\theta) + V_y t + D_V \rfloor \sin dll' \\ y = \lfloor R_{air}[1-\cos(t\dot\theta)] + V_x t \rfloor \sin d + \lfloor R_{air}\sin(t\dot\theta) + V_y t + D_V \rfloor \cos dll' \end{cases}$$

$R_{air}$ being the radius of the turn that the airplane would have without wind, $\dot\theta$ being the angular speed of the airplane in the air during the turn that the airplane would have without wind, $V_x$ and $V_y$ being the components of the wind speed vector, t being the time with t=0 at the start of the turn, $D_v$ being the distance to the turn and d being the drift angle.

* * * * *